No. 837,180. PATENTED NOV. 27, 1906.
H. L. BOCK.
RIFLE SIGHT.
APPLICATION FILED JULY 29, 1905.
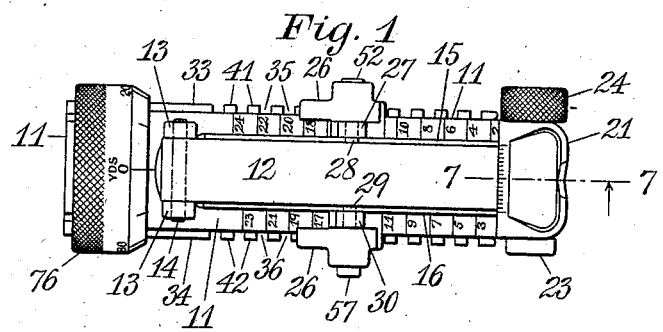
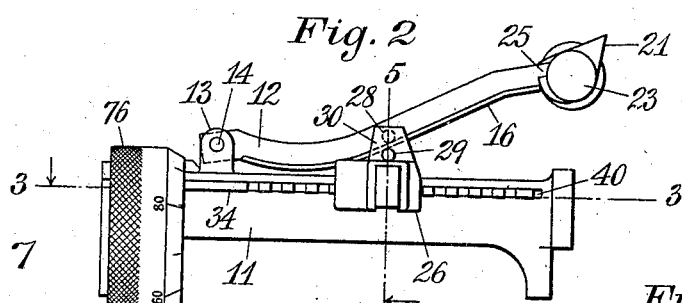
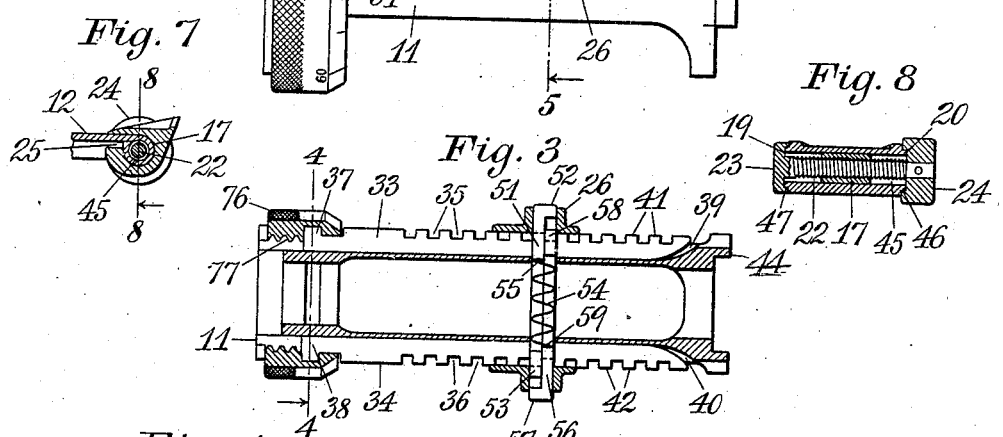
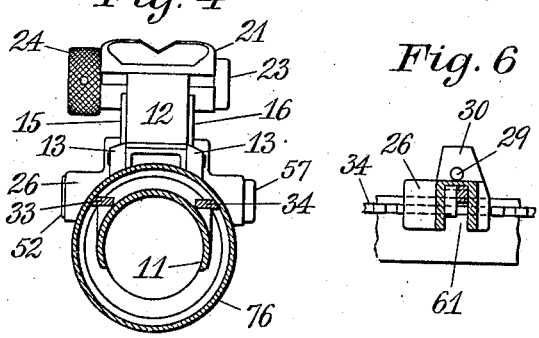
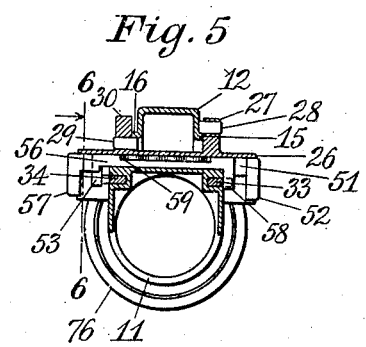
Witnesses:
H. Mallner
Janette S. Ellsworth
Inventor
Henry L. Bock
By Wm. H. Honiss, Atty.

UNITED STATES PATENT OFFICE.

HENRY LEWIS BOCK, OF QUEBEC, QUEBEC, CANADA, ASSIGNOR TO ROSS RIFLE COMPANY, OF QUEBEC, CANADA.

RIFLE-SIGHT.

No. 837,180.  Specification of Letters Patent.  Patented Nov. 27, 1906.

Application filed July 29, 1905. Serial No. 271,741.

*To all whom it may concern:*

Be it known that I, HENRY LEWIS BOCK, a citizen of the United States, and a resident of Quebec, in the Province of Quebec and Dominion of Canada, have invented certain new and useful Improvements in Rifle-Sights, of which the following is a full, clear, and exact specification.

This invention relates to sights for firearms and ordnance in general; and it consists in improved means for elevating the sighting-piece, whereby an extreme degree of accuracy and ease and convenience of manipulation are obtained.

The invention is herein shown in connection with the sight of an army-rifle.

Figure 1 is a plan view of a sight device embodying this invention. Fig. 2 is a side view of Fig. 1 viewed from the left-hand side of the firearm. Fig. 3 is a plan in section on the line 3 3 of Fig. 2. Fig. 4 is an end view in section, taken on the line 4 4 of Fig. 3. Fig. 5 is a sectional end view in section, taken on the line 5 5 of Fig. 2. Fig. 6 is a fragmentary side view and shows the sight-slide in section, taken on the line 6 6 of Fig. 5. Fig. 7 is a fragmentary side view in cross-section, taken on the line 7 7 of Fig. 1. Fig. 8 is a fragmentary end view in section, taken on the line 8 8 of Fig. 7.

The sight-base 11 is suitably formed and bored, so that it may be conveniently secured to the barrel and stock of the rifle or other firearm with which it is to be used. The swinging leaf 12, which is preferably formed of sheet metal, is pivoted at 14 to a pair of lugs 13, formed on the front end of the base 11. The free end of the leaf 12, Fig. 7, is bent over upon itself and is tapped to form a nut 17, which receives the adjusting-screw 22, and is inclosed in the transverse hole 45 in the sighting-piece 21. A slot 25 provides an opening in one side of the hole 45, through which the leaf 12 extends, and which permits the sighting-piece 25 to be slipped endwise over the nut 17. The adjusting-screw 22 has a head 23, Fig. 8, which engages one end of the sighting-piece 21, while the other end of the sighting-piece is engaged by the knurled collar 24, secured to the end of the adjusting-screw, so that the turning of the screw will move the sighting-piece 21 across the end of the leaf 12. The adjusting-screw head 23 and collar 24 are recessed or dished at 19 and 20, respectively, so that they receive and encircle the hubs 46 and 47, formed on the ends of the sighting-piece 21, which is thus prevented from spreading open at the slot 25 and in turn prevents the nut 17 from spreading open.

The sides of the leaf 12 are bent outwardly at their edges to form the ribs 15 and 16, Fig. 5. The rib 15 is engaged on its upper side by the pin 28, and the rib 16 is engaged on its under side by the pin 29. The pins are carried in upwardly-extending lugs 27 and 30, appurtenant to the elevator-slide 26, the latter being adapted to move horizontally along the base, so as to swing the leaf 12 on the pivot 14. The contour of the ribs 15 and 16 is arranged in a compensatory curve, whereby the desired steps in the elevation of the sighting-piece 21 may be obtained by equidistant horizontal movements of the elevator-slide 26. By locating the pins 28 and 29 so that each exerts a little pressure upon its corresponding rib 15 or 16 the leaf 12 is subjected to a slight torsional strain, which enables the elasticity of the metal to be utilized in keeping the device free from any looseness in the articulated joints without interfering to any appreciable extent with their freedom of movement.

The elevator-slide 26, which is fitted to slide on the base 11, is kept from rising therefrom by the two index-slides 33 and 34, which fit in slots formed for them in the meeting faces of the slide 26 and the base 11, Fig. 5, the fit being sufficiently free to permit movement of each part relative to the others. The elevator-slide 26 has fitted into it two lock-bolts 51 and 56, Figs. 3 and 5, placed side by side and having the heads 52 and 57 and the downwardly-projecting teeth 53 and 58, respectively. The lock-bolts 51 and 56 fit into a slot 61, formed in the elevator-slide, and are pressed endwise in opposite directions by the spring 54, the opposite ends of which engage the shoulders 55 and 59, formed in the lock-bolts 51 and 56, respectively, thus drawing the teeth 53 and 58 against the outer edges of the index-slides 34 and 33, respectively.

The two index-slides 33 and 34, Fig. 3, are each provided with a row of notches, preferably so disposed that the notches 35 of the slide 33 are opposite the notches 36 of the slide 34. The teeth 53 and 58 of the lock-bolts 51 and 56 are of a size to fit these notches and are so disposed with reference to each other that when the tooth 58 of the lock-bolt 56 engages one of the notches 35 of the index-slide 33 the tooth 53 of the other lock-bolt 51 will rest against the outer surface or land 42 of the slide 34 half-way between two of the notches of that slide, and vice versa. By pressing the two heads 52 and 57 toward each other between the thumb and finger of one hand the teeth 53 and 58 are carried outside of the slots, leaving the elevator-slide free to be moved. Thus as the elevator-slide 26 is moved along the base 11 the teeth 53 and 58 may alternately enter the notches of their respective index-slides. This permits the movement of the elevator-slide 26 to be locked at steps equal to one-half the distance between the centers of the notches.

In order to provide for an accurate adjustment of the position of the elevator-slide 26 upon the base 11, the index-slides 33 and 34 are adapted to be moved endwise by rotating the micrometer-thimble 76, which may be checked or knurled, as shown, to facilitate this operation. The index-slides 33 and 34 are provided with ears 37 and 38, Fig. 3, which fit an annular groove provided for them on the interior surface of the thimble 76, this interior surface being also threaded at 77 to fit a corresponding thread formed on the base 11. The pitch of this thread is preferably such that one turn of the thimble 76 will move the slides endwise a distance equal to one-half the pitch of the notches 35 and 36—that is, assuming the elevator-slide 26 to have one of its teeth in engagement with one of the notches one turn of the thimble 76 would move the elevator-slide horizontally the same distance that it would be moved if the index-slides 33 and 34 remained stationary and the tooth were released and the elevator-slide 26 moved by hand until the opposite tooth engaged its next adjacent notch. The thimble 76 is provided with circumferential graduations, so that any desired fraction of rotation of the collar may be indicated, thus forming what is practically a micrometer adjustment for the elevator-slide. A vernier graduation may also be provided, if desired.

In ordinary practice the notches of the index-slides 33 and 34 are spaced at intervals which will enable the elevator-slide 26 in moving from one notch to the next to raise or lower the leaf 12 to an extent suitable for a change of one hundred yards in the range of the firearm, and the base 11 is preferably graduated, so as to show at a glance the range for which the sight is set. In such a case it is preferable to graduate the thimble 76 in ten parts, so as to indicate each ten yards of the range. The spacing of the notches and the circumferential graduations of the thimble may, however, be varied in many ways to suit any desired system of range indication in yards, meters, or any other standard.

In the operation of this device the operator presses the heads 52 and 57 of the lock-bolts toward each other between his finger and thumb, and after thus unlocking the elevator-slide 26 moves it to and relocks it in the notch nearest to the required range, as indicated on the base 11. Then by turning the thimble 76 to the required point, as indicated by the circumferential graduations, he completes the adjustment.

It is not essential that two index-slides should be provided, nor is it essential that the lock-bolts should alternately engage the notches on the opposite slides, although this construction is thought to be preferable. This is especially so where the desired pitch of the notches is small, since it permits the use of a wider notch in each index-slide, and consequently a heavier tooth for each lock-bolt for a given step of movement in the elevator-slide. The notches and lock-bolts may, however, be so disposed that both sides are in engagement at the same time, or a single slide only need be employed, if desired, and the pitch of the thimble-thread may be adapted to give any required step of movement to the index-slide. Also the thimble 76 may be so connected to the base 11 and the index-slides 33 and 34 as to move endwise in its rotation and carry the index-slides with it, as shown in the drawings, or it may be journaled to the base, so that it moves the index-slides without itself having any endwise movement.

I claim as my invention—

1. In a firearms-sight, comprising a swinging leaf, an elevator engaging therewith and mounted for horizontal movement, means for indexing the elevator to uniformly-spaced positions, and means for adjusting the elevator to determinate positions intermediate its index positions.

2. In a firearms-sight, comprising a swinging leaf, an elevator engaging therewith and mounted for horizontal movement, means for indexing the elevator to uniformly-spaced positions, and means for adjusting the elevator to determinate positions intermediate its index positions, comprising a screw-threaded member provided with micrometer graduations.

3. In a firearms-sight, the combination of a base, a swinging-leaf sight, an elevator engaging with the leaf, and mounted to slide along the base, means for indexing the slide at predetermined intervals along the base, and screw-threaded means for adjusting the slide to determinate small distances away from its index positions.

4. In a firearms-sight, the combination of an elevator for the sight, an index member for locating the slide at predetermined positions, and screw-threaded adjusting means for moving the index member determinate distances.

5. In a firearms-sight, the combination of an elevator for the sight, an index member provided with notches for locating the elevator at predetermined positions, and screw-threaded adjusting means for moving the index member to carry it and the elevator determinate distances from the index position.

6. In a firearms-sight, the combination of an elevator for the sight, and means for positioning and adjusting the elevator, provided with notches for locating the elevator at definite positions, and provided with a screw-threaded member for adjusting the elevator to determinate positions intermediate those determined by the said notches.

7. The combination with a swinging-leaf sight, of means for elevating and lowering the sight, comprising indexing members provided with two series of indexing-notches, an elevator-slide engaging with the swinging leaf, and provided with two locating-bolts for engaging alternately with the two series of notches, and a screw-threaded member for effecting and adjusting the index members and the elevator.

8. In a sight for firearms, the combination of a base, an elevator-slide, an index-slide attached to the elevator-slide, and a thimble provided with thread-operated means for moving the index-slide.

9. In a sight for firearms, the combination of a base, an elevator-slide, an index-slide attached to the elevator-slide, and a thimble threaded for rotation of the base for moving the index-slide.

10. In a sight for firearms, the combination of a base, an index-slide, an elevator-slide provided with means for locking it at will in predetermined positions to the index-slide, and rotatably-operated means for moving the index-slide.

11. In a sight for firearms, the combination of a base a notched index-slide, an elevator-slide provided with means for engaging the notches, and a threaded thimble connected to the index-slide and mounted for rotation on the base.

12. In a sight for firearms, the combination of a base, a notched index-slide, an elevator-slide, a lock-bolt carried by the elevator-slide, and provided with means for engaging the notches of the index-slide, and a threaded thimble connected to the index-slide and mounted for rotation on the base.

13. In a sight for firearms, the combination of a base, a pair of notched index-slides, an elevator-slide mounted for movement along the base, a pair of lock-bolts extending from side to side of the elevator-slide and arranged to alternately engage the notches of the index-slides, and rotatable means for moving the index-slides.

14. In a sight for firearms, the combination of a base, a swinging leaf, an elevator-slide movable along the base and provided with means for swinging the leaf, said means engaging the leaf with torsional strain, to preserve a close-fitting connection.

15. In a sight for firearms, the combination of a movable sighting-piece, provided with an open-sided transverse hole with hubs extending therefrom, a nut within the transverse hole and formed of sheet metal bent upon itself and extending through the side opening in the transverse hole, and a screw fitting the nut and provided at both ends with recessed heads encircling the hubs.

In witness whereof I have signed my name to this specification in the presence of two subscribing witnesses.

HENRY LEWIS BOCK. [L. s].

Witnesses:
 WILLIAM W. HENRY,
 SADIE E. GREEN.